Aug. 27, 1929.　　W. D. MOUNT ET AL　　1,725,763
KILN
Filed April 4, 1921
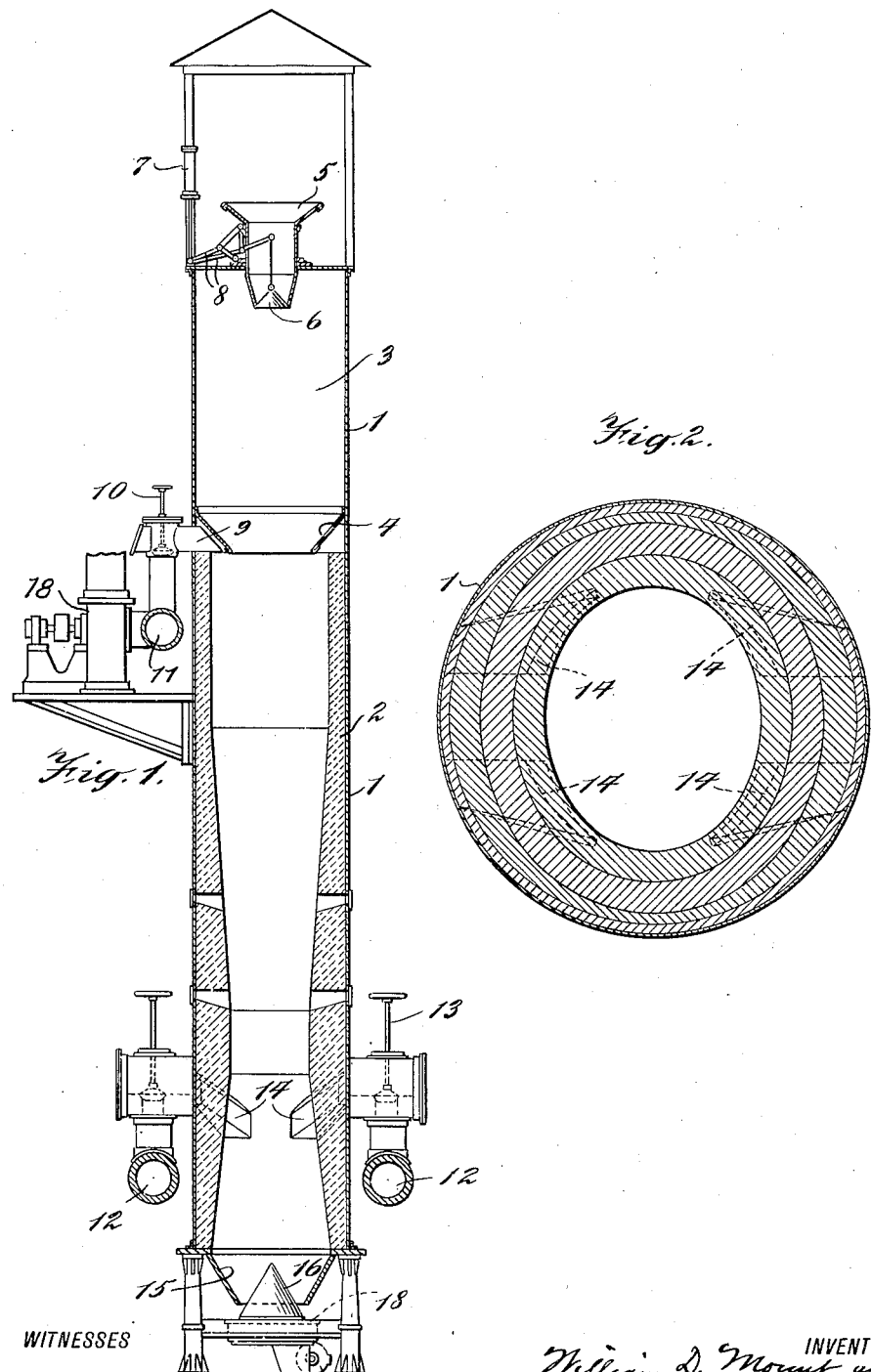

UNITED STATES PATENT OFFICE.

WILLIAM D. MOUNT, OF LYNCHBURG, VIRGINIA, AND IRVING WARNER, OF WILMINGTON, DELAWARE.

KILN.

Application filed April 4, 1921. Serial No. 458,280.

In the production of lime from limestone the temperature of burning should not greatly exceed that needed for the complete removal of the carbon dioxide if the highest quality of lime is to be obtained. When the decarbonization has proceeded to the point where all of the gas has been expelled, the lime should be promptly removed out of the zone of the intense heat and into a cooling zone; first to prevent "dead burning" and re-carbonization due to exposure to the combustion gases, and second, that the cooling may be progressive following the principle of the counter current; the hot lime giving up its heat to the incoming air for combustion thereby cooling the one and preheating the other. A kiln of the shaft type, other things being equal, will have the highest fuel economy when so operated as to be cold at the top and cold at the bottom, and that its capacity under these conditions will be greatest when discharging continuously. Where gases are introduced into and then burned within the reducing chamber, it is difficult in prior constructions to cause the burning gas to pass uniformly through the column of descending stone, the tendency being for the gas to creep up along the sides of the kiln to the exhaust opening.

An object of our invention is to provide a kiln in which a maximum output of lime of the best and uniform quality can be produced with a maximum efficiency and economy.

A further object is to provide a kiln in which close chemical control of the reaction is possible and a more uniform distribution of the burning fuel gas throughout the mass of stone in the reaction zone obtained.

Other objects and advantages will be apparent from the following description and the novel features of the invention will be particularly pointed out in claim. The nature of the application of the invention to practice will be understood from the following description of an embodiment of the invention:

In the drawings:

Fig. 1 is a sectional elevation of a kiln constructed in accordance with the invention, and Fig. 2 is a transverse section of the kiln taken slightly above the tuyères.

In the illustrated kiln, a vertically elongated casing 1 is provided with a suitable brick or fire-clay lining 2 throughout a portion of its height to form a burning or reducing chamber. The reducing chamber has a shape usual to modern kilns with a slightly restricted portion intermediate of its ends which is adjacent the reaction zone. The upper end of the casing 1 comprises a magazine 3 which has a hopper 4 discharging into the upper end of the reducing chamber. The upper end of the magazine is provided with a charging hopper 5 the mouth of which is closed by a suitable valve 6 that may be manipulated in any suitable manner, such as by compressed air in the cylinder 7 that operates through intermediate linkage 8 upon the valve. At the upper end of the reducing chamber is provided an outlet conduit 9 controlled by a valve 10, leading to an exhaust pipe 11 which is connected to a suitable exhaust fan 18. The creation of a suction in the pipe 11 by the exhaust fan will, through the conduit 9, remove the gases from the reducing chamber and create an upward draft therein. A suitable combustible gas, such as producer gas, for heating the contents of the chamber is conducted to each kiln by means of conduits 12 which are connected to a plurality of tuyères that pass through the walls of the kiln into the reducing or burning chamber in a downwardly inclined direction. There may be as many tuyères as desired, which are distributed around the inner circumference of the chamber, and in the illustrated kiln the tuyères at each side of the chamber are supplied by the separate conduits 12. Suitable valves 13 control the admission of gas to the tuyères at each side of the kiln. The tuyères preferably discharge into chamber slightly below the restricted section and as above stated in a downwardly inclined direction so that the downwardly deflected column of gas will pass into the center of the chamber and thus upwardly and uniformly through the descending column of stone instead of creeping up the sides of the kiln to the exhaust outlet at the upper end of the reducing chamber. If the major portion of the gas should pass up the sides of the chamber there would be overburning at the sides and underburning in the center. A number of peep holes are provided at suitable points in the walls of the chamber between the tuyères and the discharge outlet, in any one of which a pyrometer may be placed for indicating the temperature at different heights of the column of the descending stone and thus assist in maintaining close chemical control of the reduction. The lower end of the reducing chamber terminates in a discharge hopper 15 into the open end of which projects the apex of a cone 16 that may be continuously rotated by means of a suitable motor 17. The cone does not entirely fill the opening in the discharge hopper so that its rotation will cause the lime to pass downwardly upon a table 18 at the base of the cone from which it is removed in any desired manner. The space between the cone and the opening of the hopper also permits of the passage of air into the reducing chamber in order to supply the necessary oxygen for the combustion of the gases that are simultaneously admitted into the chamber through the tuyères.

In the operation of the kiln the broken limestone or other material to be reduced, is introduced through the charging hopper 5 into the magazine 3 from which it continuously descends into the preheating zone of the reduction chamber and downwardly through the reaction zone to the discharge hopper. The fuel gas is admitted into the chamber through the tuyères and in burning unites with the air entering through the bottom of the kiln to produce an intense heat, the burned gas passing upwardly and uniformly through the descending column of material and out through the conduit 9. The cone and table are continuously rotated to remove the reduced material and permit fresh material to descend through the reaction zone which is just above the tuyères. The magazine carries sufficient material to be reduced so as to maintain the column of material within the preheating chamber through which the burned gases will pass at a uniform height. Tests of the gases in the outlet conduit 11 will furnish information of value in regulating the fuel gas supply. The reduced material, after leaving the reaction zone, passes downwardly through what may be called the cooling zone through which the air passes in an upward direction before combining with the fuel gas that is concomitantly admitted through the tuyères. The entering air is preheated by the hot descending lime so that the maximum heat by the combustion of the air and gas in the reaction zone is obtained and the lime is cooled to facilitate the handling thereof. Unless the tuyères are downwardly inclined as they enter the reducing chamber the gases will tend to creep along the sides of the kiln and cause over-burning at the sides with under-burning at the center, instead of passing through the center as well as the sides of the descending column. It will be noted that the gas burns only on the inside of the kiln chamber due to the admission of the air at the bottom of the kiln and there is therefore no loss of heat by the burning gases before coming in contact with the stone. The temperature measuring pyrometer may be located at various points along the kiln to furnish the necessary information for determining the proper amount of gas to be admitted for the temperature requisite to maximum economy of operation, the exhaust gas is utilized to preheat the descending material before reaching the reaction zone whereby little if any heat is lost through the exhaust, and the lime is cooled to a temperature which is practically that of the incoming air, at the same time preheating the admitted air. The magazine provides the uniform height of column of stone to be preheated which is essential to the most efficient and economical operation and eliminates the necessity of constant attention at the charging end. It will therefore be seen that a kiln of this construction enables a very effective, close, constant and complete chemical control to be had of every step and factor in the lime production operation, which makes possible a realization of the continuity of operation and co-ordination of the various factors, so essential to uniformity in quality and quantity of output, and the attainment of the highest efficiency and economy.

While utilization of the hereindescribed kiln for the production of lime is contemplated it will be understood that the kiln will be equally useful for reducing various other substances in addition to limestone. It will also be obvious that various changes in the details and arrangements of parts may be made by those skilled in the art within the principle and scope of the invention.

We claim:

In a kiln, an elongated vertical burning chamber having inlets for admitting gaseous fuel at a zone intermediate its ends, means for controlling the rate of flow of solid material through said chamber including means for continuously removing finished material from its lower end and means for permitting the entrance of air in contact with the finished material thereby cooling the same, and in quantity sufficient to support combustion of the gaseous fuel admitted through said inlet, means for driving said removing apparatus, a raw material magazine of substantial size above the burning chamber for continuously supplying raw material to the burning chamber, said magazine having an inlet and means for normally closing the same, and a discharge opening so situated that its contents will automatically discharge by gravity through said opening into said chamber at its upper end to keep said chamber filled with material at a constant level, and means for withdrawing gases by suction from the upper end of said chamber and thereby inducing an upward draft through said chamber.

In witness whereof, we hereunto subscribe our signatures.

WILLIAM D. MOUNT.
IRVING WARNER.